United States Patent
Bahn

[19]

[11] Patent Number: 5,926,000
[45] Date of Patent: Jul. 20, 1999

[54] APPARATUS FOR OBTAINING THREE-PHASE POSITION DETECTION SIGNALS BY MEANS OF TWO COILS

[75] Inventor: Itsuki Bahn, Tokyo, Japan

[73] Assignee: Kabushikigaisha Sekogiken, Tokyo, Japan

[21] Appl. No.: 08/849,151

[22] PCT Filed: Sep. 6, 1996

[86] PCT No.: PCT/JP96/02547

§ 371 Date: May 29, 1997

§ 102(e) Date: May 29, 1997

[87] PCT Pub. No.: WO97/13317

PCT Pub. Date: Apr. 10, 1997

[30] Foreign Application Priority Data

Oct. 2, 1995 [JP] Japan ................................ 7-289067

[51] Int. Cl.⁶ .................................................. G05B 19/29
[52] U.S. Cl. .................... 318/602; 318/254; 318/701; 318/439
[58] Field of Search ................................ 318/600–602, 318/569, 254, 138, 439, 701, 652–670

[56] References Cited

U.S. PATENT DOCUMENTS 4,107,587  8/1978  Ban et al. .............................. 318/439
4,818,908  4/1989  Tamae et al. ........................... 310/171
5,331,262  7/1994  Francisco ............................... 318/452

FOREIGN PATENT DOCUMENTS 51-30909    3/1976   Japan .
51-101820   9/1976   Japan .
51-122307  10/1976   Japan .
62-171490   7/1987   Japan .
1-107697    4/1989   Japan .
1-206892    8/1989   Japan .
1-318579   12/1989   Japan .
2-101988    4/1990   Japan .

*Primary Examiner*—David Martin
*Attorney, Agent, or Firm*—Staas & Halsey

[57] ABSTRACT

A plurality of projections (15a), half-projections (16a), and recesses (18a), each having a width equal to an electrical angle of 120 degrees, are formed on the outer peripheral portion of a conductor disk (15) that rotates synchronously with a motor. A coil (10a) that faces only the projections (15a) and a coil (10b) that faces the projections (15a) and the half-projections (16a) are fixed to a stationary armature. Three-phase position detection signals are obtained in accordance with the mode of change in impedances caused when these two coils (10a, 10b) face the outer peripheral portion of the conductor disk (15).

2 Claims, 5 Drawing Sheets

Fig. 7
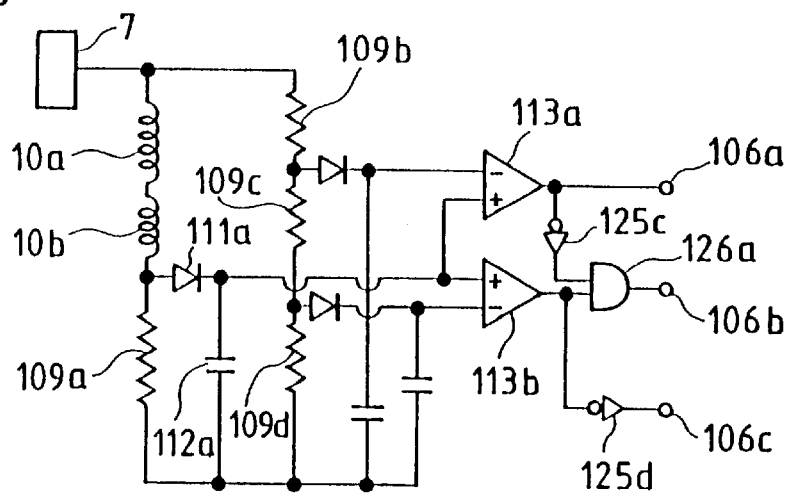
Fig. 8
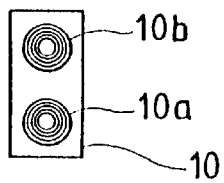
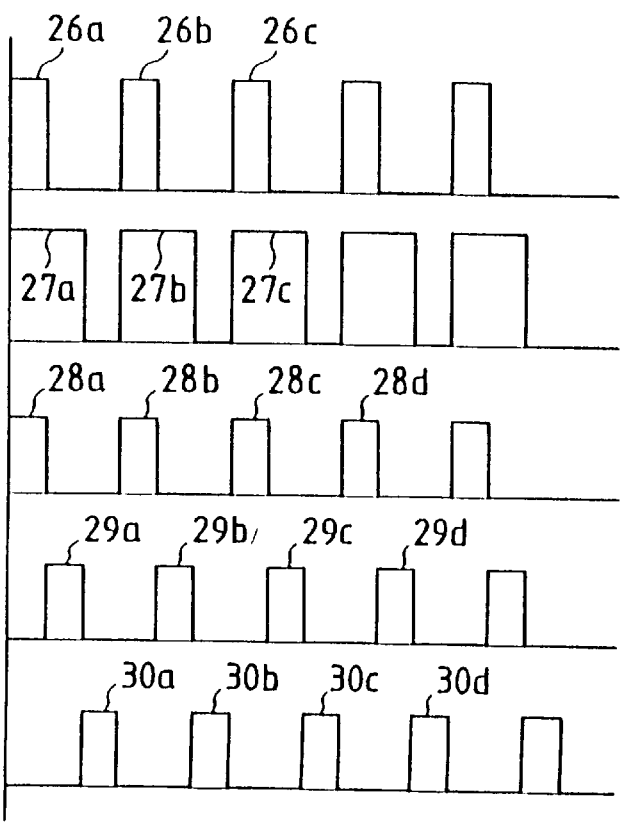
Fig.9(a)
Fig.9(b)
Fig.9(c)
Fig.9(d)
Fig.9(e)

APPARATUS FOR OBTAINING THREE-PHASE POSITION DETECTION SIGNALS BY MEANS OF TWO COILS

TECHNICAL FIELD

The present invention relates to an improvement of a position detector for a three-phase DC motor.

RELATED ART

A three-phase DC motor (e.g., reluctance motor) requires use of an apparatus for obtaining three-phase position detection signals. Conventionally, therefore, three coils for use as position detecting elements are fixed to the body of the motor, while a conductor rotor is made to rotate synchronously with the motor. When the conductor rotor rotates facing the coils, change in the impedance of each coil is detected through the conductor rotor, whereby the three-phase position detection signals are obtained.

As described above, according to the prior art, the three-phase DC motor requires three position detecting coils, and this gives rise to problems such as complicated construction, large-sized body, and resultant high cost.

SUMMARY OF THE INVENTION

The object of the present invention is to provide an apparatus for obtaining three-phase position detection signals for a three-phase DC motor by means of two position detecting coils.

In order to achieve the above object, a plurality of projections, half-projections, and recesses, each having a width equal to an electrical angle of 120 degrees, are formed on the outer peripheral portion of a conductor disk that rotates synchronously with a motor. On the other hand, a stationary armature has a first coil, which is located in a position so that it faces only the projections, and a second coil, which is located in a position so that it faces the projections and the half-projections but does not face the outer periphery of the disk that constitutes the recesses. The first and second coils are energized, and three-phase position detection signals are obtained in accordance with the mode of change in impedances corresponding to a first section in which the projections face the first and second coils, a second section in which the half-projections face only the second coil, and a third section in which none of the projections and half-projections face either coil.

According to the present invention, as described above, the three-phase position detection signals can be obtained using two coils, as one set of components, for position detection. As a result, an electric circuit for obtaining the position detection signals can be simplified.

BRIEF DESCRIPTION OF THE DRAWINGS

FIG. 7 shows another example different from the electric circuit diagram of FIG. 6;

FIG. 8 is a plan view of a position detecting coil of the apparatus of FIG. 2; and FIGS. 9(*a*)–9(*e*) are graphs showing signals delivered from output terminals of the circuits shown in the electric circuit diagrams of FIGS. 6 and 7.

BEST MODE OF CARRYING OUT THE INVENTION

Referring first to the plan view of FIG. 1 and the development view of FIG. 4, an arrangement of a three-phase-polarization reluctance motor to which the present invention is applied will be described. In the description to follow, all the angle indications are of electrical angle.

Figure 1:
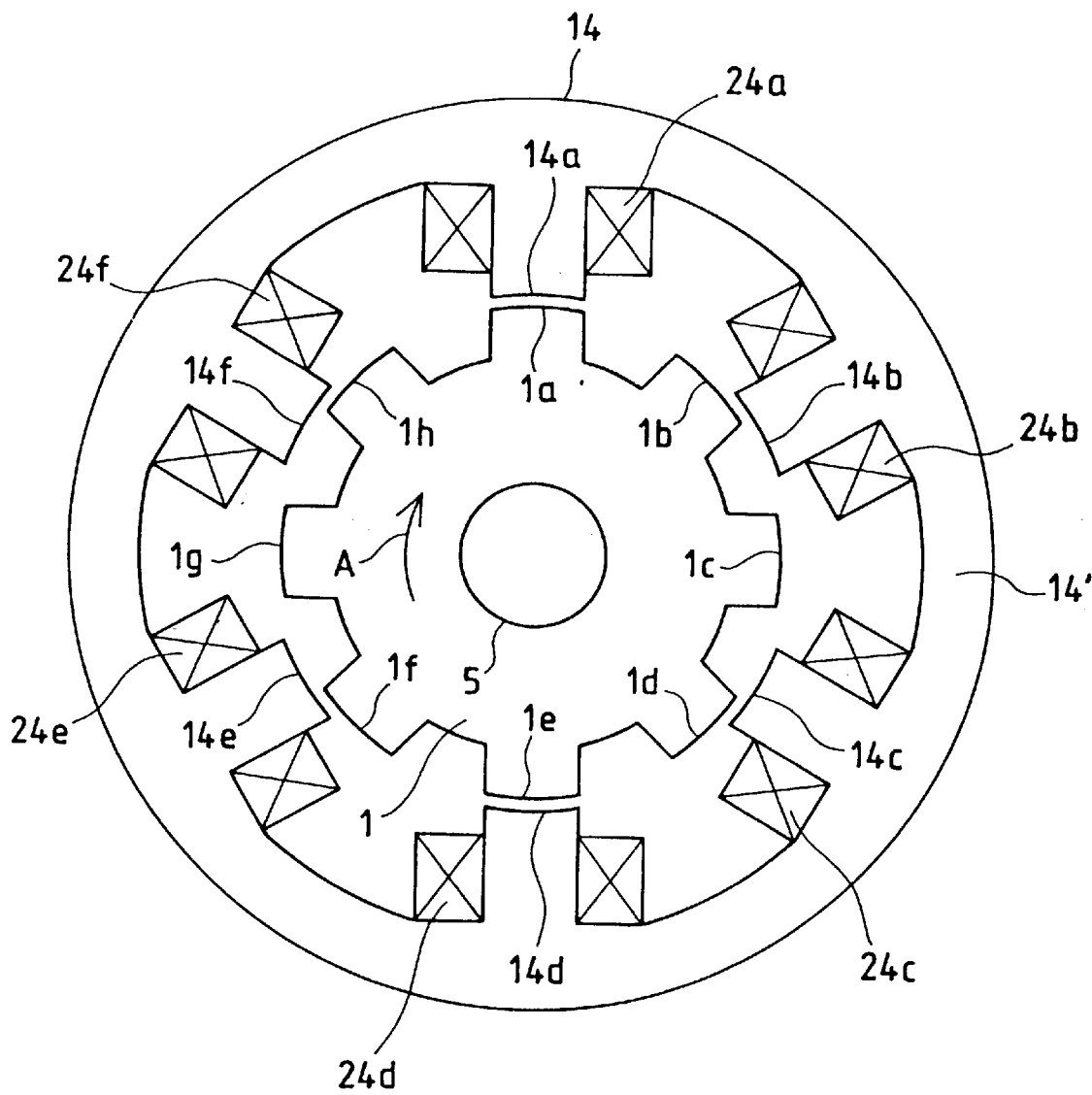
FIG. 1 is a plan view showing a stationary armature and a rotor of a reluctance motor.

Referring to FIG. 1, a rotor 1 and a stationary armature 14 of the reluctance motor will be described. Eight salient poles 1*a*, 1*b*, 1*c*, . . . 1*h* are formed at regular intervals in the circumferential direction around the rotor 1. The width of each salient pole measures 180 degrees, and the salient pole (1*a*) and its adjacent salient pole (1*b*) have a phase difference of 360 degrees. This rotor 1 is made from well-known means obtained by laminating silicon steel sheets. The rotor 1 is fixed to a rotating shaft 5.

The stationary armature 14 is formed with six magnetic poles 14*a*, 14*b*, . . . 14*f* that are arranged at regular intervals in the circumferential direction. The width of each magnetic pole is equal to the width of the salient pole and measures 180 degrees. This armature 14, like the rotor 1, is made from well-known means obtained by laminating silicon steel sheets.

The magnetic poles 14*a*, 14*b*, . . . 14*f* of the stationary armature 14 are wound with armature coils 24*a*, 24*b*, . . . 24*f*, respectively. Referring now to the development view of FIG. 4, the relative arrangements of these magnetic poles and the rotor 1 will be described. A ring portion 14' and the magnetic poles 14*a*, 14*b*, . . . 14*f* are fixed to a motor frame (element designated by reference numeral 3 in FIG. 2 and mentioned later), thereby forming the stationary armature 14. The ring portion 14' is a magnetic core that serves as a magnetic circuit.

The armature coils 24*a* and 24*d* are connected in series or parallel with each other, thus forming a first-phase armature coil. The armature coils 24*b* and 24*e* are connected in series or parallel with each other, thus forming a second-phase armature coil. The armature coils 24*c* and 24*f* are connected in series or parallel with each other, thus forming a third-phase armature coil. When the second-phase armature coil (24*b*, 24*e*) is energized, the salient poles 1*b* and 1*f* are attracted to the magnetic poles 14*b* and 14*e*, causing the rotor 1 to rotate in the direction of arrow A in FIGS. 1 and 4. When the rotor 1 in the state of FIG. 4 rotates through 60 degrees in the direction of arrow A, the second-phase armature coil is de-energized, and the third-phase armature coil (24*c*, 24*f*) is energized.

When the rotor further rotates through 120 degrees in the direction of arrow A, the third-phase armature coil (24*c*, 24*f*) is de-energized, and the first-phase armature coil (24*a*, 24*d*) is energized. Thus, each time the rotor 1 rotates through 120 degrees in the same direction, the energized armature coil changes cyclically, in the order of the first-phase armature coil, second-phase armature coil, third-phase armature coil, first-phase armature coil, . . . . As a result, the rotor 1 shown in FIGS. 1 and 4 is driven as the rotor of the three-phase-polarization reluctance motor. When this is done, one of each of two magnetic poles (14*a* and 14*d*, 14*b* and 14*e*, or 14c and 14f) that are situated at axially symmetric positions to each other is magnetized as a north pole, and the other is magnetized as a south pole, as shown in FIG. 4. Thus, each two simultaneously excited magnetic poles are always different in polarity, so that leakage magnetic fluxes passing the unexcited magnetic poles have opposite directions to each other, thereby preventing counter-torque from being generated.

Figure 2:
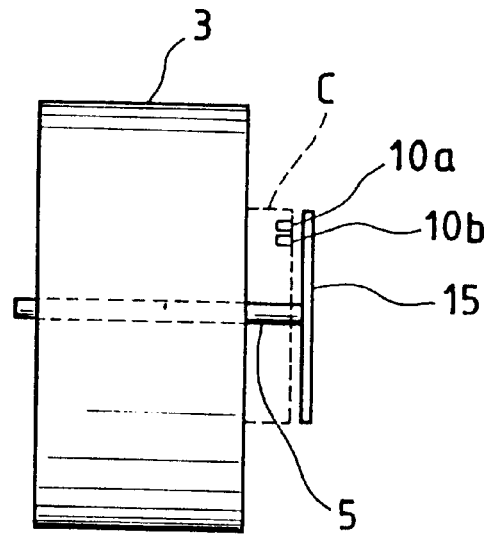
FIG. 2 is a side view of an apparatus for obtaining position detection signals according to the present invention.
Figure 3:
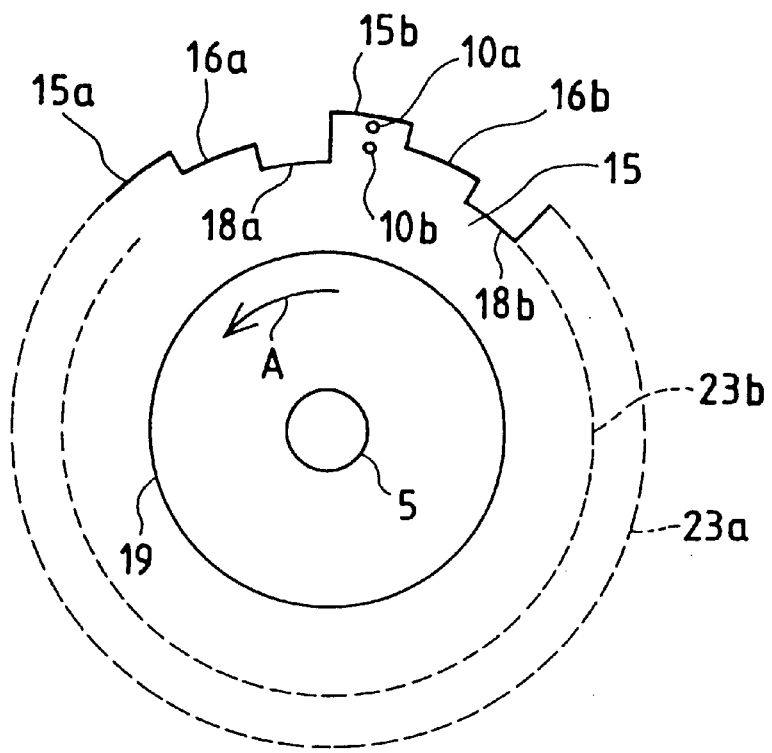
FIG. 3 is a plan view of a rotating disk for position detection of the apparatus of FIG. 2.

Energizing the first-, second-, and third-phase armature coils is controlled in accordance with the respective rotational positions of the salient poles 1a, 1b, 1c, . . . , 1h. Referring then to FIGS. 2 and 3, means for detecting the rotational positions of the salient poles and generating position detection signals will be described.

Figure 4:
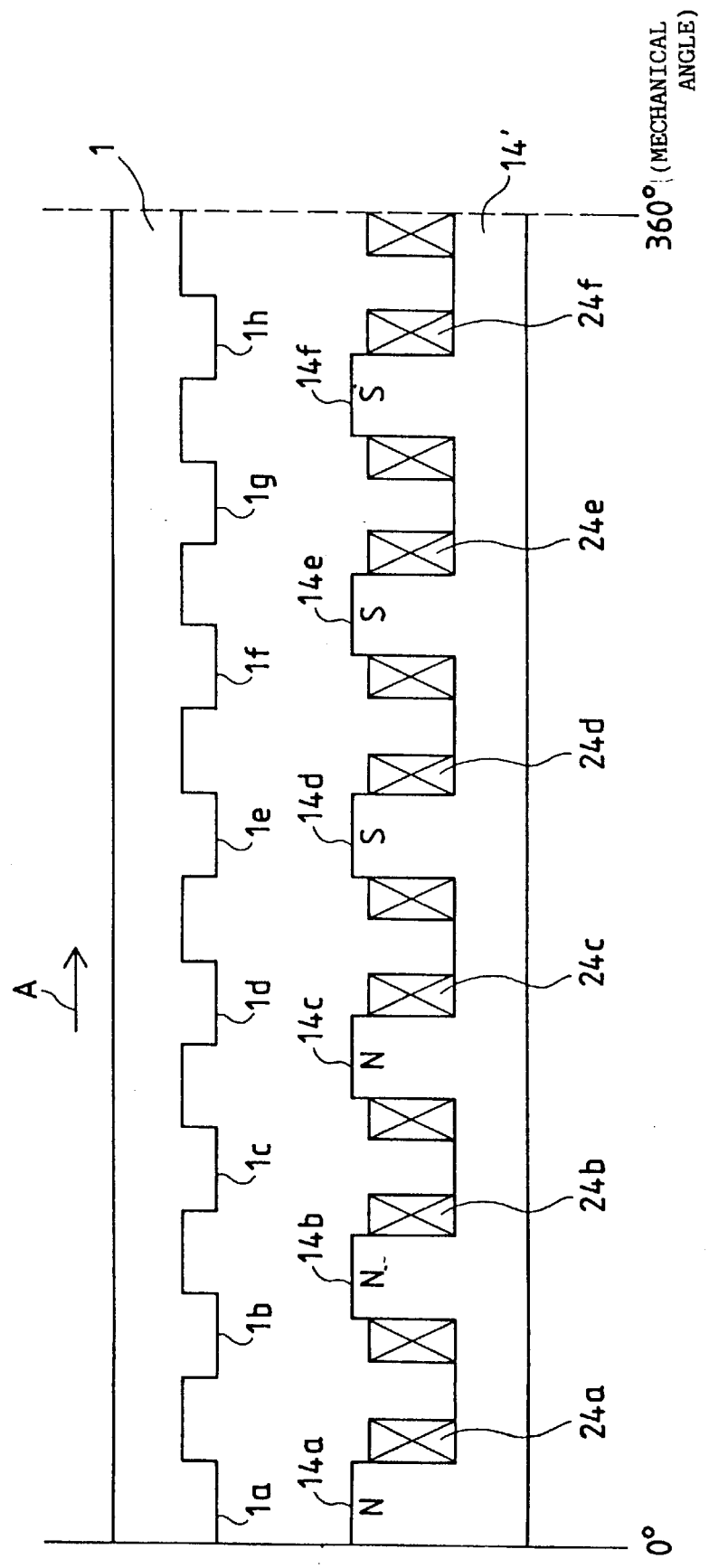
FIG. 4 is a development view showing the armature and the rotor of FIG. 1.

The motor frame 3 has the stationary armature 14 (ring portion 14' and magnetic poles 14a, 14b, . . . 14f) of FIGS. 1 and 4 fixed on its inner peripheral surface. The rotating shaft 5 penetrates the frame 3, having its one end projecting outside the frame 3. A plastic disk 19 is fixed to one end portion of the rotating shaft 5 in a manner such that its center is in alignment with the axis of the rotating shaft 5. Further, a rotating disk 15 formed of a metal conductor, such as aluminum, is fixed on the outer periphery of the plastic disk 19. The center of the rotating disk 15 is in alignment with the axis of the rotating shaft 5. In consequence, the rotating disk 15 can rotate integrally with the rotating shaft 5, that is, simultaneously with the rotor 1 (not shown in FIG. 2) of the motor.

Referring to FIG. 3, the shape of the rotating disk 15 will be described. A projection 15a, half-projection 16a, recess 18a, projection 15b, half-projection 16b, recess 18b, . . . are successively formed on the outer periphery of the rotating disk 15 in the clockwise direction of FIG. 3. More specifically, a half-projection is formed directly adjacent to a projection, a recess adjacent to the half-projection, and another projection adjacent to the recess, on the outer periphery of the rotating disk 15. The projections 15a, 15b, . . . have a width of 120 degrees each, and there is a distance of 240 degrees between one projection and its adjacent projection. The half-projections 16a, 16b, . . . also have a width of 120 degrees each, and there is a distance of 240 degrees between one half-projection and its adjacent half-projection. Likewise, the recesses 18a, 18b, . . . also have a width of 120 degrees each, and there is a distance of 240 degrees between one recess and its adjacent recess.

According to the present embodiment, eight projections 15a, 15b, . . . , eight half-projections 16a, 16b, . . . , and eight recesses 18a, 18b, . . . are formed on the rotating disk 15. Dotted lines 23a and 23b in FIG. 3 roughly indicate that another six projections, six half-projections, and six recesses, besides the illustrated projections 15a and 15b, half-projections 16a and 16b, and recesses 18a and 18b (eight in total), are formed at regular intervals in the circumferential direction of the rotating disk 15.

As shown in FIG. 2, a casing C is fixed to the base of the frame 3. The casing C is provided with two coils 10a and 10b arranged in radial directions at a predetermined interval from each other. These coils 10a and 10b face the outer peripheral portion of the rotating disk 15 across a narrow gap, thereby forming a position detecting element. The coils 10a and 10b are flat coils with about 20 turns, and the surface of one (coil 10a) of these coils faces the projections 15a, 15b, . . . only. The other (coil 10b) faces the projections 15a, 15b, . . . and the half-projections 16a, 16b, . . . , and does not face the outer peripheral portion of the disk 15 that constitutes the recesses.

Figure 5:
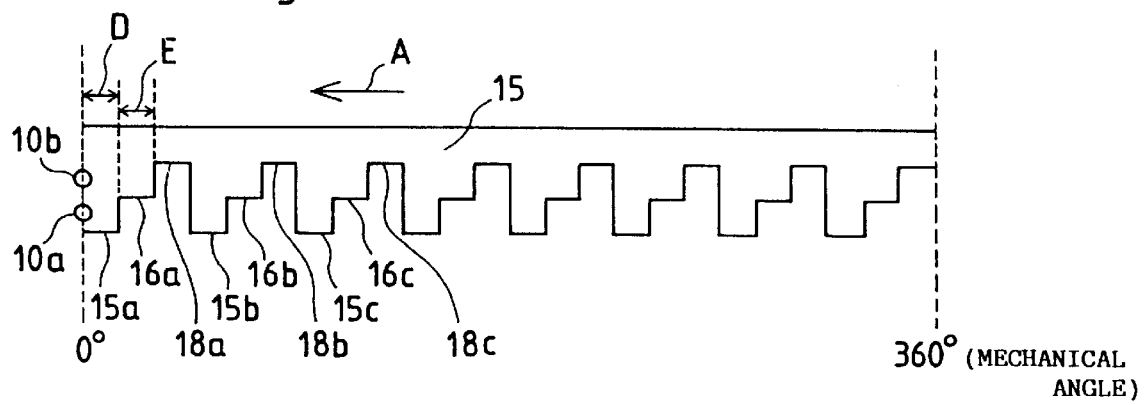
FIG. 5 is a development view showing the rotating disk for position detection of FIG. 3.

Referring to the development view of the rotating disk 15 of FIG. 5, the relationships between the outer peripheral portion of the rotating disk 15 and the coils 10a and 10b will be described. In FIG. 5, arrow A indicates the rotating direction of the rotating disk 15, D represents the width of the projection 15a, and E represents the width of the half-projection 15b. As mentioned before, the widths D and E measure 120 degrees each. As seen from FIG. 5, the projections 15a, 15b, . . . further extend radially outward (downward in FIG. 5) from the locations of the coils 10a and 10b, while the half-projections 16a, 16b, . . . further extend to the halfway position between the coils 10a and 10a. It is also indicated that neither of the positions of the coils 10b and 10a are reached by the outer peripheral portion of the rotating disk 15 that constitutes the recesses 18a, 18b, . . . .

Referring now to the circuit diagram of FIG. 6, the means for obtaining the position detection signals through the coils 10a and 10b will be described.

Figure 6:
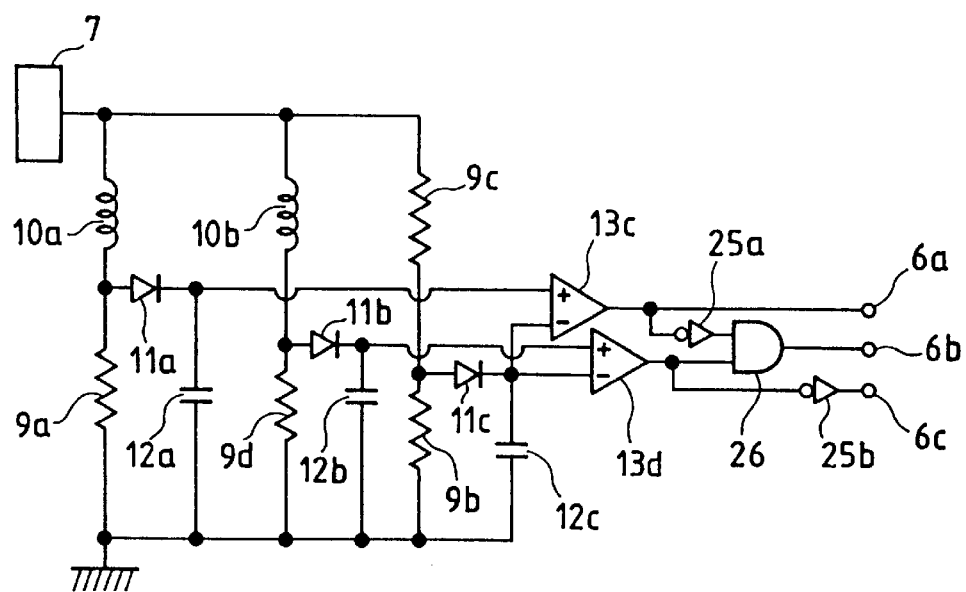
FIG. 6 shows an example of an electric circuit diagram of the apparatus of FIG. 2.

The apparatus shown in the circuit diagram of FIG. 6 gives three-phase position detection signals to terminals 6a, 6b and 6c according to the change in the values of currents flowing through the coils 10a and 10b. A series circuit of the coil 10a and a resistor 9a, a series circuit of the coil 10a and a resistor 9d, and a series circuit of resistors 9c and 9b are connected in parallel with an oscillator 7, which oscillates at a frequency on the order of megacycle. In FIG. 6, the coils 10a and 10b and the resistors 9a, 9b, 9c and 9d constitute a bridge circuit. This bridge circuit is adjusted so as to be balanced when the coils 10a and 10b face none of the projections 15a, 15b, . . . and the half-projections 16a, 16b, . . . . When the bridge circuit is balanced, the respective outputs of low-pass filters, composed of a capacitor 12a and a diode 11a supplied with voltage from the junction of the coil 10a and the resistor 9a, of a capacitor 12b and a diode 11b supplied with voltage from the junction of the coil 10a and the resistor 9d, and of a capacitor 12c and a diode 11c supplied with voltage from the junction of the resistors 9c and 9b, become equal, so that the outputs of operational amplifiers 13c and 13d are low.

When the rotating disk 15 rotates, the coil 10a repeatedly faces the projection 15a through the width D (120 degrees) shown in FIG. 5, and then faces the next projection 15b through the width D after passing an interposed non-confrontation period of 240 degrees. While the coil 10a and the projections 15a, 15b, . . . are facing one another, the impedance lowers, the resistor 9a undergoes a substantial voltage drop, and the output of the operational amplifier 13c becomes high. As a result, the output of the operational amplifier 13c will have a rectangular waveform that repeatedly becomes high through 120 degrees and becomes low through 240 degrees. The resulting output signals are designated by 26a, 26b, 26c, . . . in FIG. 9(a). The output signals 26a, 26b, 26c, . . . have a phase difference of 360 degrees.

Furthermore, when the rotating disk 15 rotates, the coil 10b repeatedly faces the projection 15a and its directly adjacent half-projection 16a through a width D+E (=240 degrees) shown in FIG. 5, and then faces the next projection 15b and its directly adjacent half-projection 16b through the width D+E after passing an interposed non-confrontation period of 120 degrees. As a result, the output of the operational amplifier 13d will have a rectangular waveform that repeatedly becomes high through 240 degrees and becomes low through 120 degrees. The resulting output signals are designated by 27a, 27b, 27c, . . . in FIG. 9(b). The output signals 27a, 27b, 27c, . . . have a phase difference of 360 degrees.

Since the output of the operational amplifier 13c is delivered directly to the terminal 6a, signals 28a, 28b, 28c, . . . shown in FIG. 9(c) are outputted from the terminal 6a.

As shown in FIG. 6, the terminal 6b receives from an AND circuit 26 the logical product of the output (FIG. 9(b)) of the operational amplifier 13d and the output (FIG. 9(a)) of the operational amplifier 13c inverted through an inverter circuit 25a. Accordingly, signals 29a, 29b, 29c, . . . shown in FIG. 9(d) are outputted from the terminal 6b.

Since the terminal 6c is supplied with an output (FIG. 9(b)) of the operational amplifier 13d inverted through an inverter circuit 25b, as shown in FIG. 6, signals 30a, 30b, 30c, . . . shown in FIG. 9(e) are outputted from the terminal 6c.

The signals from the terminal 6a become first-phase position detection signals, the signals from the terminal 6b become second-phase position detection signals, and the signals from the terminal 6c become third-phase position detection signals. The width of each signal of each phase is 120 degrees and there is a phase difference of 120 degrees between the first-phase position detection signal 28a and the second-phase position detection signal 29a, between the second-phase position detection signal 29a and the third-phase position detection signal 30a, and between the third-phase position detection signal 30a and the first-phase position detection signal 29b.

If the coils 10a and 10a shown in FIG. 5 are paired and fixedly juxtaposed on a substrate 10, as shown in FIG. 8, the two coils 10a and 10b can be treated as one component, so that they can be easily attached to the stationary armature.

Referring now to FIG. 7, another example, different from the electric circuit of FIG. 6, for obtaining the position detection signals will be described. In this example of FIG. 7, the coils 10a and 10b are connected in series with the oscillator 7.

In FIG. 7, the coils 10a and 10b, resistors 109a, 109b, 109c and 109d constitute a bridge circuit. The output of a low-pass filter, composed of a capacitor 112a and a diode 111a supplied with voltage from the junction of the resistor 109a and a series circuit of the coils 10a and 10b, is applied to the respective plus-side terminals of operational amplifiers 113a and 113b. Furthermore, on the side of the oscillator 7, the resistors 109b, 109c and 109d are connected in series in the order named. The output of a low-pass filter that is supplied with voltage from the junction of the resistors 109b and 109c is applied to the minus-side terminal of the operational amplifier 113a, and moreover, the output of a low-pass filter that is supplied with voltage from the junction of the resistors 109c and 109d is applied to the minus-side terminal of the operational amplifier 113b.

In this bridge circuit, when the coils 10a and 10b face the projections 15a, 15b, . . . , the impedances of these coils 10a and 10b fall; the resistor 109a undergoes a substantial voltage drop; and the output of the operational amplifier 113a becomes high only in this case. In any other case, the output of the operational amplifier 113a is low. On the other hand, the output of the operational amplifier 113b becomes low only when the coils 10a and 10b are situated confronting the recesses 18a, 18b, . . . without facing any of the projections or half-projections. In any other case, the output of the operational amplifier 113b becomes high. This effect can be obtained by suitably adjusting the values of the resistors 109a, 109b, 109c and 109d. Accordingly, (A) when the coils 10a and 10b face the projections 15a, 15b, . . . .

the current flowing through the resistor 109a increases, so that the input voltage applied to the plus terminal of the operational amplifier 113a increases, whereupon the output of the operational amplifier 113a becomes high, and the output of the operational amplifier 113b also becomes high, (B) when the coil 10b faces the half-projections 16a, 16b, . . . :

the output of the operational amplifier 113a turns low, while the output of the operational amplifier 113b is kept high, and (C) when the coils 10a and 10a face none of the projections 15a, 15b, . . . and the half-projections 16a, 16b, . . . :

the output of the operational amplifier 113a is kept low, while the output of the operational amplifier 113b turns low.

Thus, the output of the operational amplifier 113a is high only in the case of (A), and output of the operational amplifier 113b is low only in the case of (C). Accordingly, a signal (FIG. 9(c)), that becomes high only when the coils 10a and 10b face the projections 15a, 15b, . . . , is outputted from a terminal 106a that receives the output of the operational amplifier 113a. Also, a signal (FIG. 9(e)) that becomes high only when the coils 10a and 10b face none of the projections 15a, 15b, . . . and the half-projections 16a, 16b, . . . is outputted from a terminal 106c that receives the output of the operational amplifier 113b after it is inverted by means of an inverter circuit 125b. If the logical product of the output of the operational amplifier 113b and the output of the operational amplifier 13a inverted through an inverter circuit 125a is obtained by means of an AND circuit 126a, the AND circuit 126a outputs a signal (FIG. 9(d)) that is high only when the outputs of the operational amplifiers 113a and 11b are low and high, respectively, that is, only in the case (B) where the coil 10b faces the half-projections 16a, 16b, . . . .

As described above, the signals having the width of 120 degrees and the phase differences of 120 degrees, as shown in FIGS. 9(c), 9(d) and 9(e), are outputted from the output terminals 6a, 6b and 6c of the circuit shown in FIG. 7, so that the first-, second-, and third-phase position detection signals can be obtained.

I claim:

1. An apparatus for obtaining three-phase position detection signals using two coils, comprising:

a conductor disk having, on the outer peripheral portion thereof, equal numbers of first projections having a width equal to an electrical angle of 120 degrees, second projections having a projection length shorter than the projection length of the first projections by a predetermined value and a width equal to an electrical angle of 120 degrees, and recesses having no projection length and a width equal to an electrical angle of 120 degrees, formed at regular intervals in the circumferential direction in a fixed order of arrangement;

a first coil, as a position detecting element, fixed to a body of a motor so that a surface of the first coil faces only said first projections with narrow air gaps therebetween;

a second coil, as a position detecting element, fixed to the body of the motor so that a surface of the second coil faces said first and second projections with narrow air gaps therebetween but does not face the outer peripheral portion of the disk constituting the recesses; and an electric circuit for supplying high-frequency AC currents to said first and second coils, thereby obtaining the three-phase detection signals in accordance with a change in impedances generated corresponding individually to a first section in which the projections face the first and second coils, a second section in which the half-projections face only the second coil, and a third section in which none of the projections and half-projections face either coil, wherein said electric circuit includes:

a first electric circuit for detecting the change of impedances in accordance with the change in values of the currents supplied to the first and second coils, thereby obtaining a first-phase position detection signal;

a second electric circuit for detecting the change in values of the currents supplied to the first and second coils, based on the change in impedance of the second coil caused when the second coil faces the first and second projections and the change in impedance of said first coil, to obtain a second-phase position detection signal, and a third electric circuit for obtaining a third-phase position detection signal by converting supplied high-frequency AC current, generated by the change in impedance of said second coil, into DC current and inverting the DC current through an inverter circuit.

2. An apparatus for obtaining three-phase position detection signals by means of two coils according to claim 1, wherein said first and second coils in said electric circuit are connected in series.

* * * * *